US009890907B1

(12) United States Patent
Highfield, Jr. et al.

(10) Patent No.: US 9,890,907 B1

(45) Date of Patent: Feb. 13, 2018

(54) FCC CATALYST CYCLONE SAMPLING METHOD AND APPARATUS

(71) Applicant: Marathon Petroleum Company LP, Findlay, OH (US)

(72) Inventors: Johnny M. Highfield, Jr., Flatwoods, KY (US); Barton A. Wallace, Grayson, KY (US); Jeremy C. Nott, Lesage, WV (US)

(73) Assignee: Marathon Petroleum Company LP, Findlay, OH (US)

( * ) Notice: Subject to any disclaimer, the term of this patent is extended or adjusted under 35 U.S.C. 154(b) by 333 days.

(21) Appl. No.: 14/554,295

(22) Filed: Nov. 26, 2014

Related U.S. Application Data

(60) Provisional application No. 61/910,607, filed on Dec. 2, 2013.

(51) Int. Cl.
*G01N 1/10* (2006.01)
*F17D 3/01* (2006.01)

(52) U.S. Cl.
CPC ...................................... *F17D 3/01* (2013.01)

(58) Field of Classification Search
CPC ............................................... G01N 2001/105
See application file for complete search history.

(56) References Cited

U.S. PATENT DOCUMENTS

| | | | | |
|---|---|---|---|---|
| 2,516,097 A * | 7/1950 | Volpi | B01J 8/1872 422/310 |
| 3,070,990 A * | 1/1963 | Krinov | G01N 1/2202 55/315 |
| 4,144,759 A * | 3/1979 | Slowik | G01N 1/2211 73/863.21 |
| 4,392,870 A | 7/1983 | Chieffo et al. | |
| 5,050,603 A | 9/1991 | Stokes et al. | |
| 5,853,455 A | 12/1998 | Gibson | |
| 6,324,895 B1 * | 12/2001 | Chitnis | C10G 11/185 73/23.31 |
| 2006/0169064 A1 * | 8/2006 | Anschutz | G01N 1/2202 73/863.21 |

* cited by examiner

*Primary Examiner* — Robert R Raevis
(74) *Attorney, Agent, or Firm* — Emch, Schaffer, Schaub & Porcello Co. L.P.A.

(57) ABSTRACT

A method and apparatus for sampling fluid catalytic cracking catalyst wherein catalyst splashing is virtually eliminated, pluggage is reduced, and the temperature and velocity of the catalyst is also reduced.

7 Claims, 5 Drawing Sheets

FCC CATALYST CYCLONE SAMPLING METHOD AND APPARATUS

CROSS REFERENCE TO RELATED APPLICATION

The present patent application is a divisional of and claims the benefit of U.S. provisional patent application No. 61/910,607 filed Dec. 2, 2013.

BACKGROUND OF THE INVENTION

Fluid catalytic cracking (FCC) is a vital process used in the refining of petroleum products. The majority of the refineries in use today utilize the FCC process. Fluid catalytic cracking is used to convert the high boiling, high molecular weight hydrocarbon fractions of petroleum crude oils to more valuable gasoline, olefinic gases and other petroleum products. The FCC process vaporizes and breaks the long-chain molecules of the high boiling hydrocarbon liquids into much shorter molecules by contacting the feedstock at elevated temperatures and pressure in the presence of a catalyst, with the majority of the cracking occurring in the vapor phase. Feedstock is thereby converted into gasoline, distillate, and other liquid cracking products as well as lighter gaseous cracking products.

The cracking reactions produce carbonaceous material commonly known as coke, which deposits onto the catalyst. These coke deposits quickly reduce the catalyst's reactivity, requiring the catalyst to be regenerated. Regeneration is accomplished by burning off the coke which restores the catalyst activity. Fluid catalytic cracking can therefore be distinguished by three specific steps: the cracking step in which the hydrocarbons are converted into the lighter products, a stripping step to remove hydrocarbons absorbed on the catalyst, and a regeneration step to remove coke from the catalyst. The regenerated catalyst may then be reused in the cracking step.

FCC catalyst, both spent and regenerated, must be periodically sampled in order to monitor and track FCC unit performance. The sampling also allows the evaluation of the characteristics of the circulating equilibrium catalyst. The catalyst sampling information may be used: to adjust fresh catalyst and catalyst additive addition rates, to track the condition of the catalyst (activity, REO, surface area contaminants, etc.), or to monitor coke on the catalyst to track regenerator performance (note that this list is not intended to be an exhaustive list of the information which may be derived from catalyst samples).

Catalyst samples are typically extremely hot, often in the range of 800 to 1000° F. for spent catalyst and 1200 to 1400° F. for regenerated catalyst. Sampling catalyst often produces significant amounts of catalyst dust which can be extremely hot, and is a known skin and eye irritant. Further, catalyst sampling lines are prone to pluggage. These factors pose a risk to personnel taking the samples even when protected by the appropriate personal protective equipment (PPE).

The current method for obtaining a catalyst sample is a standard pipe, which is sloped at an angle in an attempt to minimize pluggage. The sampling pipe is directly attached to the FCC unit and, when activated, displaces catalyst sample into a desired container. Typically the catalyst is routed into a sample can which is placed in a basket in the top of a large drum, such as a 55 gallon drum known as a sampling drum. The sample can must be elevated to submerge the sample line into the sample can. This technique reduces catalyst contamination during the initial draw but it also limits the ability of the operator to monitor the flow and the level of catalyst in the sample can. Often the sample can over fills resulting in catalyst "splashing" which poses a risk to personnel taking the samples even when protected by the appropriate PPE. Further, if the sampling line is accidently disconnected from the sample can, hot catalyst is sprayed outward.

Removing the hot sample can from under the sample pipe presents another risk to the operator because the operator is exposed to the hot catalyst and the hot sample can. Once the catalyst sample is obtained, the sample line must be closed and purged with nitrogen. The current technique results in nitrogen being blown into the top of the collection drum which creates catalyst dust in the immediate area. Further, ambient conditions such as wind, rain or high heat can cause the catalyst dust to cover anything surrounding the sample can. Therefore, there exists a need for an improved and safer catalyst sampling method and apparatus which reduces catalyst dust, catalyst splashing, and user risk.

SUMMARY OF THE INVENTION

By upgrading the current sampling line to include a cyclone many of the risks may be greatly reduced or eliminated altogether. The cyclone sampler allows the catalyst to be directed straight into a sampling can, virtually eliminating catalyst splashing and allowing the operator to safely monitor the level of the sampling can, and the flow of the catalyst. The cyclone sampler eliminates the need for the sampling line to descend horizontally. Traditionally the sampling line is slopped to allow the catalyst to enter a sampling can and to reduce pluggage. This slope causes the sampling line to enter the sampling can at angle. This angled entry results in increased splashing and partially blocks the view of the user. The cyclone sampler allows the sampling line to be horizontal, from the FCC to the cyclone sampler. The catalyst enters the cyclone sampler and is directed downward, generally at about a 90-degree angle, into the sampling can. This straight approach allows more of the sample to enter the sampling can and reduces splashing over the prior art model, while allowing the user an unobstructed view of the sampling can.

The cyclone sampler also allows the operator to use a nitrogen "chaser" further reducing the risk of pluggage in the sample line and cooling the catalyst sample. The nitrogen can be used to purge the sample line, once the sample valve is closed, without spraying the catalyst uncontrolled into the sample can. The chaser is directed into the cyclone sampler and exits into the sampling can at the same 90-degree angle as the catalyst, thus reducing splashing.

The cyclone sampler also eliminates operator exposure to catalyst and catalyst dust by containing and directing the catalyst so that catalyst dust is greatly reduced in the area around the sample station. Further, utilizing a cyclone sample allows the catalyst to cool while in the cyclone vessel reducing risk of personnel exposure to 1300° F. catalyst. By utilizing a cyclone sampler, operator safety is increased while the risk of pluggage is reduced.

Other objects and advantages of the present invention become apparent to those skilled in the art upon a review of the following detailed description of the preferred embodiments and the accompanying drawings.

IN THE DRAWINGS

DETAILED DESCRIPTION OF THE INVENTION

Figure 1:
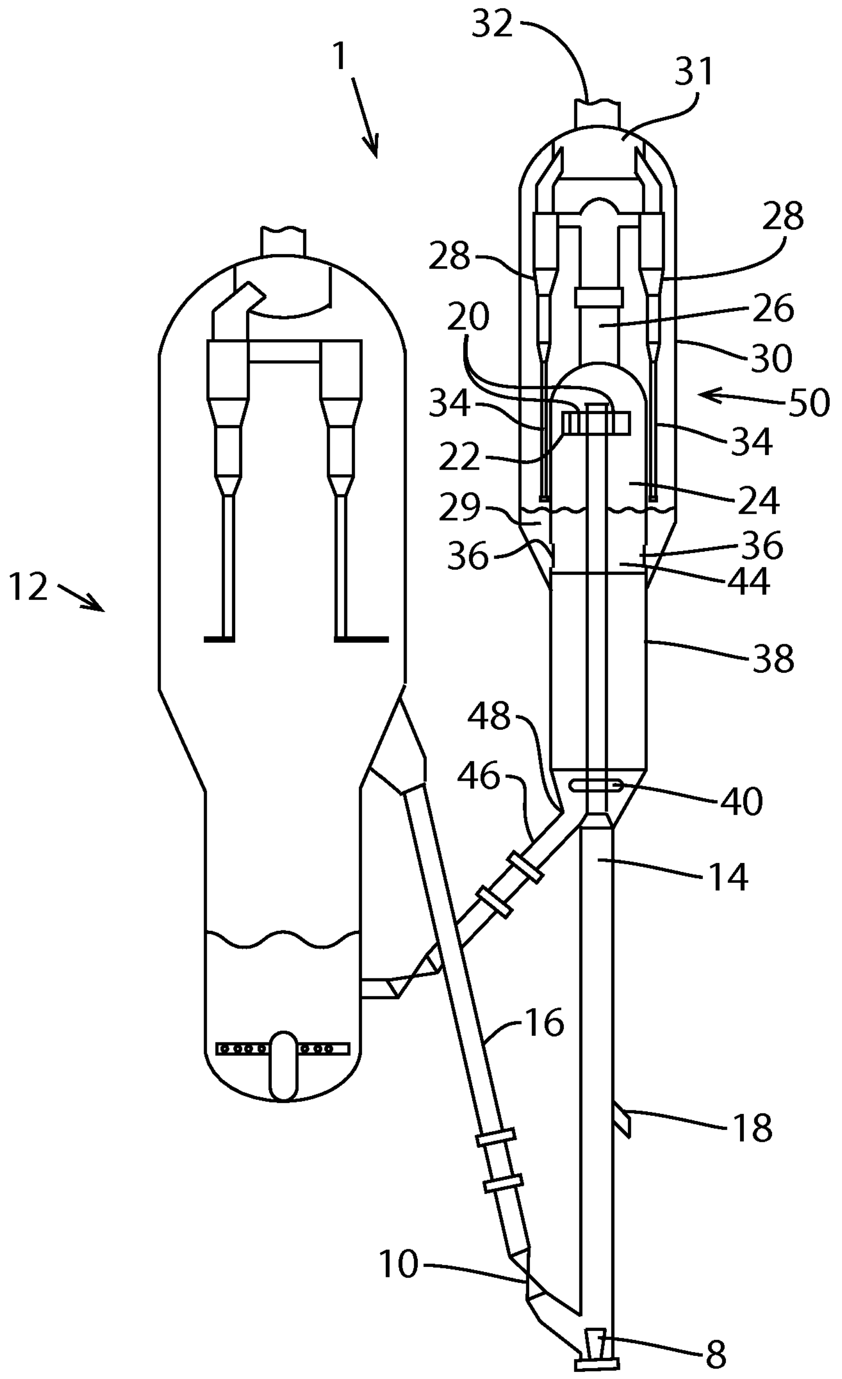
FIG. 1 PRIOR ART
FIG. 1 is a diagram of a prior art FCC unit comprising a reactor and a regenerator.

Referring now to FIG. 1, a catalytic cracking unit 1 is shown and is comprised of a regenerator 12, and a reactor 50. Catalyst is transferred from the regenerator 12 to the reactor 50 by a regenerator catalyst stand pipe 16. The rate of catalyst transfer from the reactor 50 to the regenerator 12 is regulated by a slide valve 10. A fluidization medium from nozzle 8 transports catalyst upwardly through a lower portion of a riser 14 at a relative high density until a plurality of feed injection nozzles 18 (only one is shown) inject feed across the flowing stream of catalyst particles. The resulting mixture continues upward through an upper portion of riser 14 to a riser termination device. This specific device utilizes at least two disengaging arms 20 which tangently discharge the mixture of gas and catalyst through openings 22 from a top of riser 14 into disengaging vessel 24 that effects separation of gases from the catalyst. Most of the catalyst discharged from opening 22 fall downwardly in the disengaging vessel 24 into bed 44. A transport conduit 26 carries separated hydrocarbon vapors with entrained catalyst to one or more cyclones 28 in the reactor 50 of separator vessel 30. Cyclones 28 separate spent catalyst from the hydrocarbon vapor stream. Collection chamber 31 gathers the separated hydrocarbon vapor streams from the cyclones 28 for passage to an outlet nozzle 32 and into a downtream fractionation zone (not shown). Dip legs 34 discharge catalyst from the cyclones 28 into bed 29 in the lower portion of a disengaging vessel 30 which pass through ports 36 into bed 44 and disengaging vessel 24. Catalyst and adsorbed or entrained hydrocarbons pass from disengaging vessel 24 into stripping section 38. Catalyst from opening 22 is separated in disengaging vessel 24 and passes directly into the stripping section 38. Hence, entrances to the stripping section 38 includes opening 22 and ports 36. Stripping gas, such as steam, enters a lower portion of the stripping section 38 through distributor 40 and rises counter-current to a downward flow of catalyst through the stripping section 38, thereby removing adsorbed and entrained hydrocarbons from the catalyst, The hydrocarbons flow upwardly through and are ultimately recovered with the stream by the cyclones 28. Distributor 40 distributes the stripping gas around the circumference of the stripping section 38. In order to facilitate hydrocarbon removal structured packing may be provided in stripping section 38. The spent catalyst leaves the stripping section 38 through a port 48 to spent catalyst standpipe 46 and passes into regenerator 12. The catalyst is regenerated in regenerator 12 and sent back to the riser 14 through the regenerated catalyst stand pipe 16.

Figure 2:
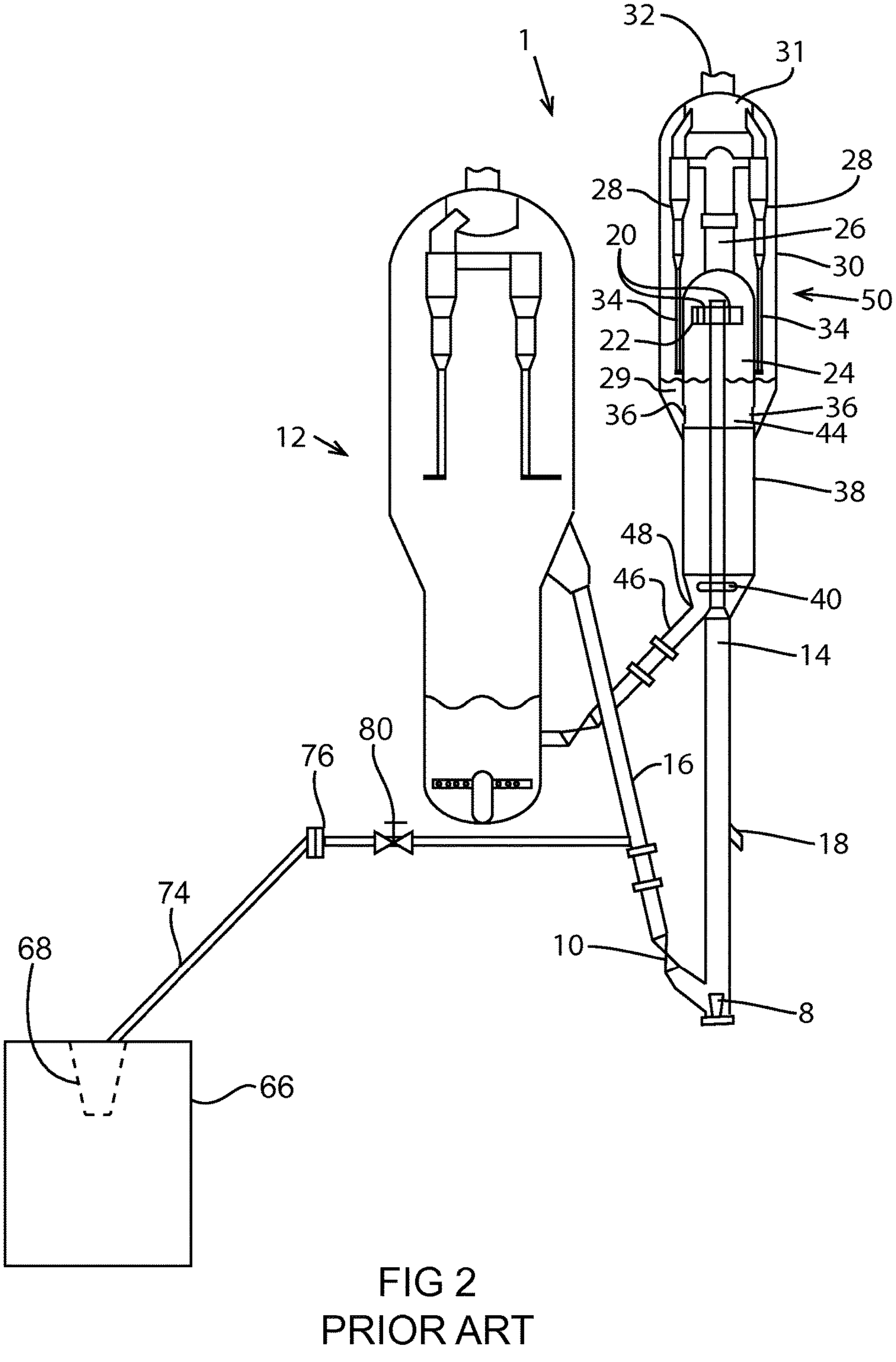
FIG 2 PRIOR ART
FIG. 2 is a side view of a prior art FCC unit with a sample line.

Referring now to FIG. 2, the prior art sampling method is shown. The FCC unit 1 having a sampling line 74, a root valve 76 and a collection vessel 66. The catalyst is routed to the collection vessel 66 through the sampling line when root valve 76 is open. The collection vessel 66 typically has a sample can (not shown) which is placed in a basket 68 in the top of the collection vessel 66. The sample can must be elevated within the basket 68 to contact the sample line 74 and direct the catalyst into the sample can. When root valve 76 is open catalyst travels through sample line 74 and into collection vessel 66 to be sampled.

Figure 3:
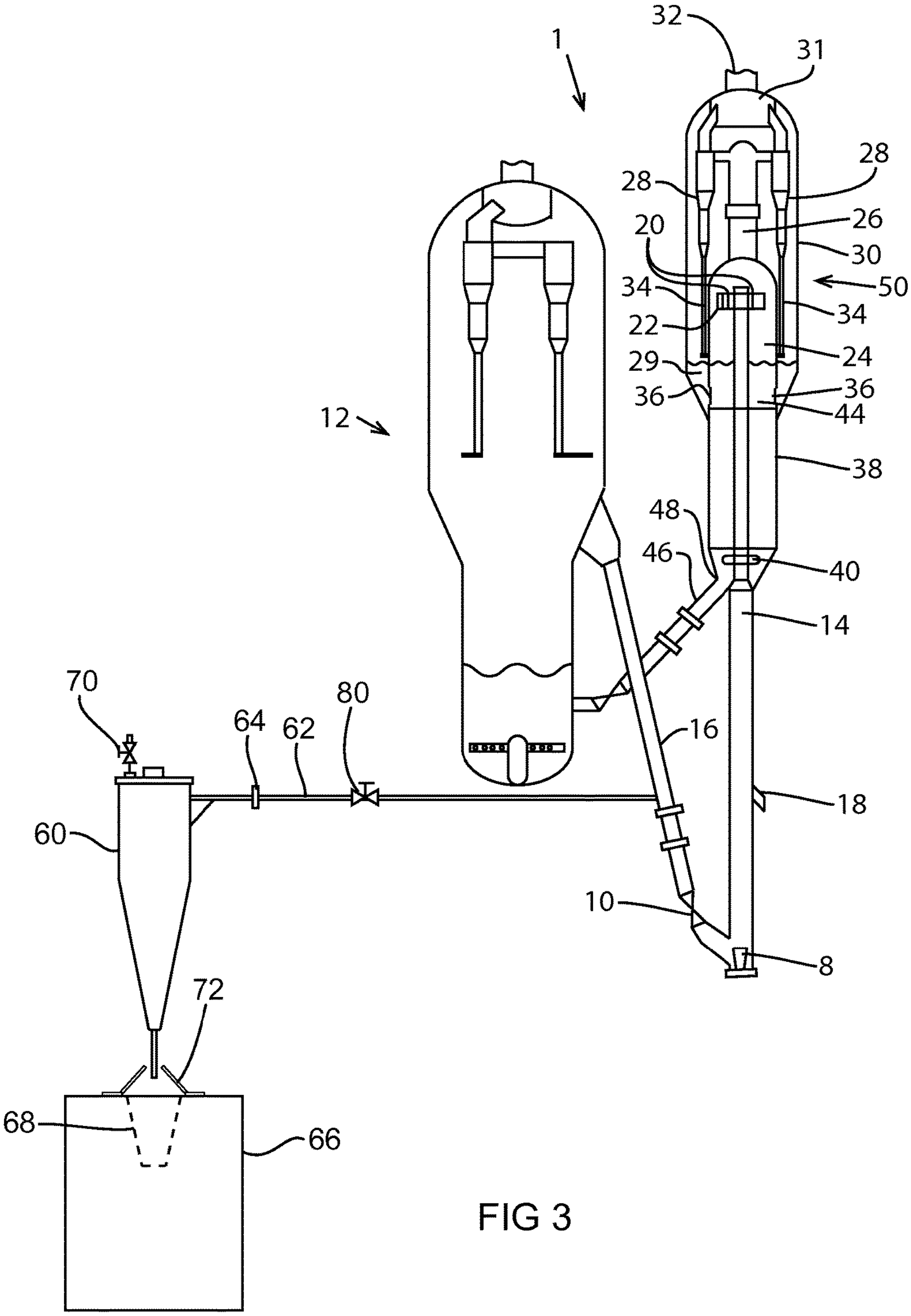
FIG. 3 is a diagram of the FCC unit of the present invention incorporating a cyclone sampler.
Figure 4:
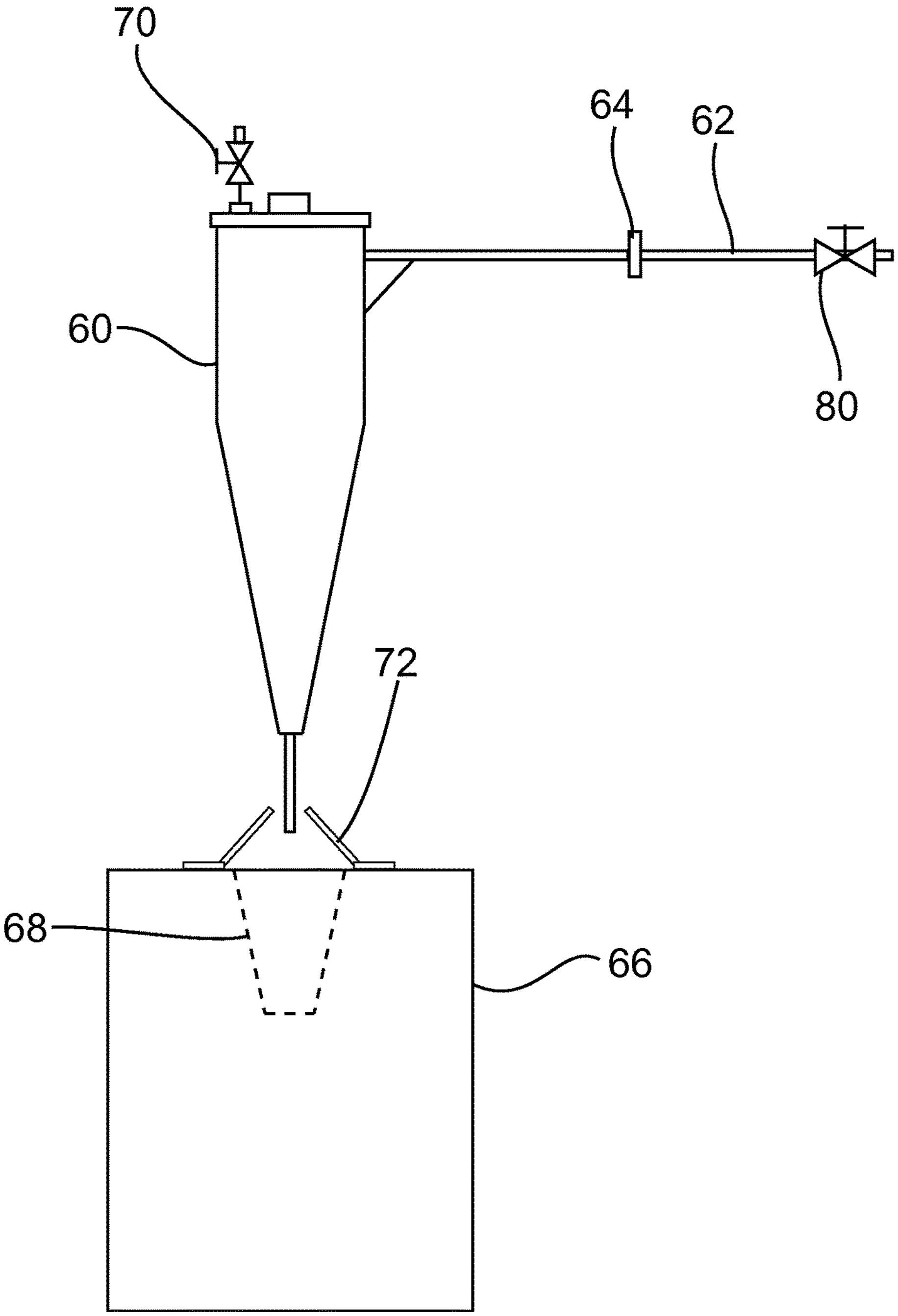
FIG. 4 is a schematic view of the cyclone sampler seen in FIG. 3.
Figure 5:
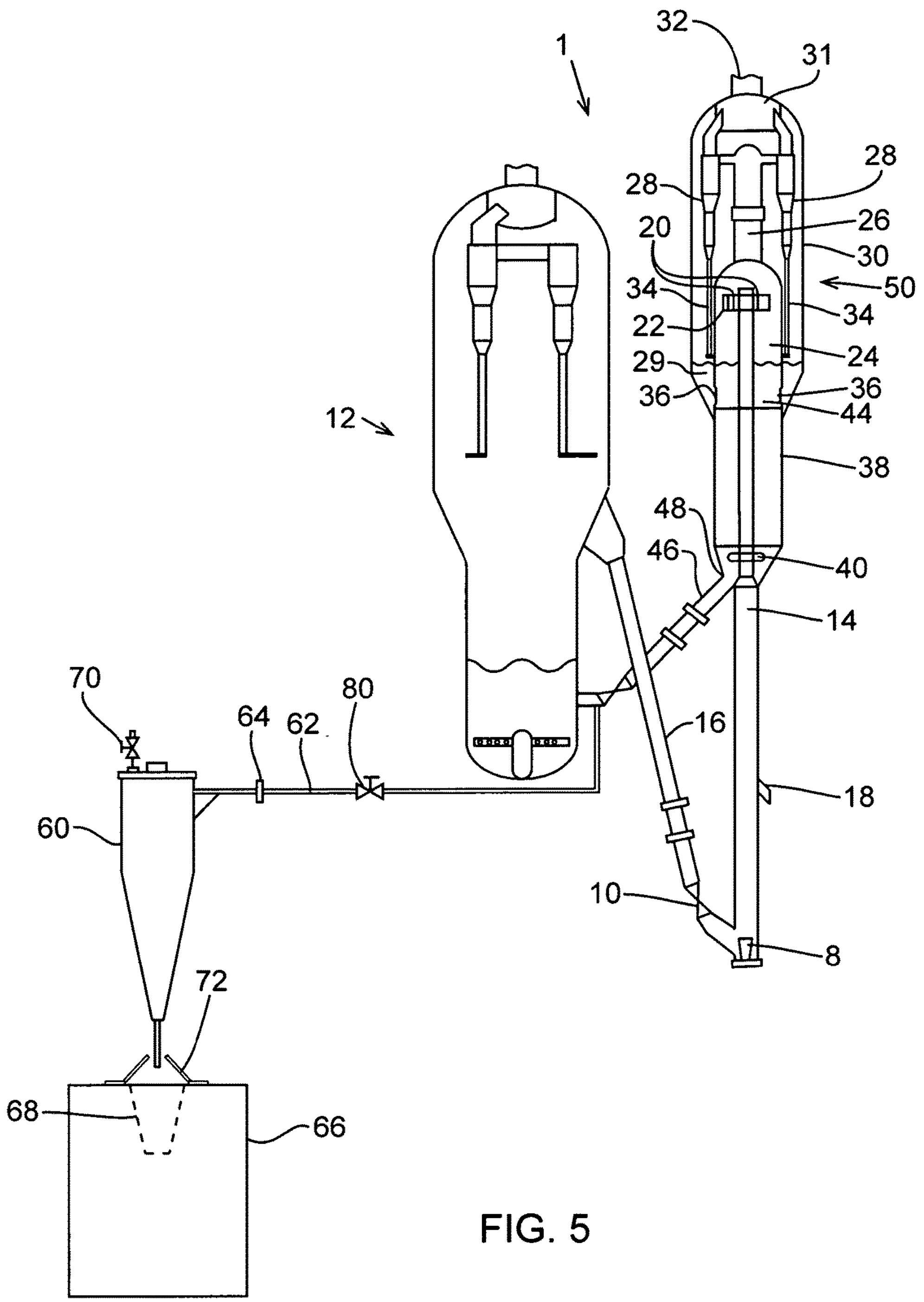
FIG. 5 is a diagram of an alternative embodiment of the FCC unit of the present invention incorporating a cyclone sampler.

Referring now to FIGS. 3 and 4, a preferred embodiment of the present invention is shown. Catalyst from the FCC unit 1 is sampled by traveling through a sampling line 62 into a cyclone sampler 60 when a valve 64 (such as a root valve) is opened. When the catalyst enters the cyclone sampler, the velocity and temperature of the catalyst can be reduced, entrained vapors may be vented to a safe location and the catalyst may be better directed into a collection vessel to avoid catalyst splashing. As the catalyst enters the cyclone sampler 60, velocity is reduced, vapors are vented and the catalyst is directed into a sample can (not shown) within a sample basket 68 contained inside a collection vesse 66. A splash guard 72 may be used to further reduce catalyst splashing.

The cyclone sampler 60 and sampling line 52 may be attached to the FCC unit 1 at any sampling location. In the preferred embodiment, the sampling line 62 attaches to the regenerated standpipe 16 so that regenerated catalyst may be sampled, in a different embodiment, the sampling line 62 may be attached to a spent catalyst standpipe 46 so that spent catalyst may be sampled.

If desired, nitrogen may be used to purge the sampling apparatus by injecting nitrogen into a valve 80. Purging of the sampling vessel reduces the risk of pluggage and reduces the temperature of the catalyst sample. In the prior art, nitrogen purging created significant catalyst splashing however by utilizing the cyclone sampler splashing is significantly reduced even during the nitrogen purging.

A vent 70 with a valve may be utilized to vent the cyclone. This vent 70 may also be used to dislodge any piuggage should it occur. The vent 70 also assists in allowing vaporlock of the catalyst sample during sampling.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

The invention claimed is:

1. A system for sampling catalyst during the operation of a fluid catalytic cracking unit, comprising in combination:
- a sampling line connected to a the catalytic crackign unit;
- a cyclone sampler connected to the sampling line;
- a valve contained within the sampling line for opening and closing the sampling line to allow the flow of catalyst into the cyclone sampler; and
- a colleciton vessel in communicaiton with the cyclone sampler, for collecting the catalyst sample, the collection vessel including a splash guard to reduce catalyst splashing as the catalyst exits an outlet of the cyclone sampler and enters the collection vessel.

2. The system of claim 1 wherein the splash guard is angled upward from the collection vessel toward the outlet of the cyclone sampler without actually engaging the outlet.

3. The system of claim 1 wherein the sampline line includes a valve to allow purging of the sampling line.

4. A system for sampling catalyst from a fluid catalytic cracking unit comprising, in combination:
- a sampling line connected to the catalytic cracking unit;
- a valve for opening the closing the flow of catalyst through the sampling line;

a cyclone sampler connected to the sampling line, capable of reducing the velocity and temperature of the catalyst flow;

a collection vessel, in communication with the cyclone sample, for collecting the catalyst sample from an outlet of the cycle sampler; and a splash guard, attached to the collection vessel, wherein the splash guard is angled upward and inward toward the outlet of the collection vessel to reduce the catalyst splashing as the catalyst exits the cyclone sampler and enters the collection vessel.

5. The system of claim 4 wherein the sampling line is generally horizontally oriented to minimize pluggage.

6. The system of claim 4 wherein the fluid catalytic cracking unit further includes a regenerated catalyst stand pipe (16) and the sampling line is connected to the stand pipe.

7. The system of claim 4 wherein the fluid catalytic cracking unit further includes a spent catalyst stand pipe (46) and the sampling line is connected to the spent stand pipe.

* * * * *